UNITED STATES PATENT OFFICE.

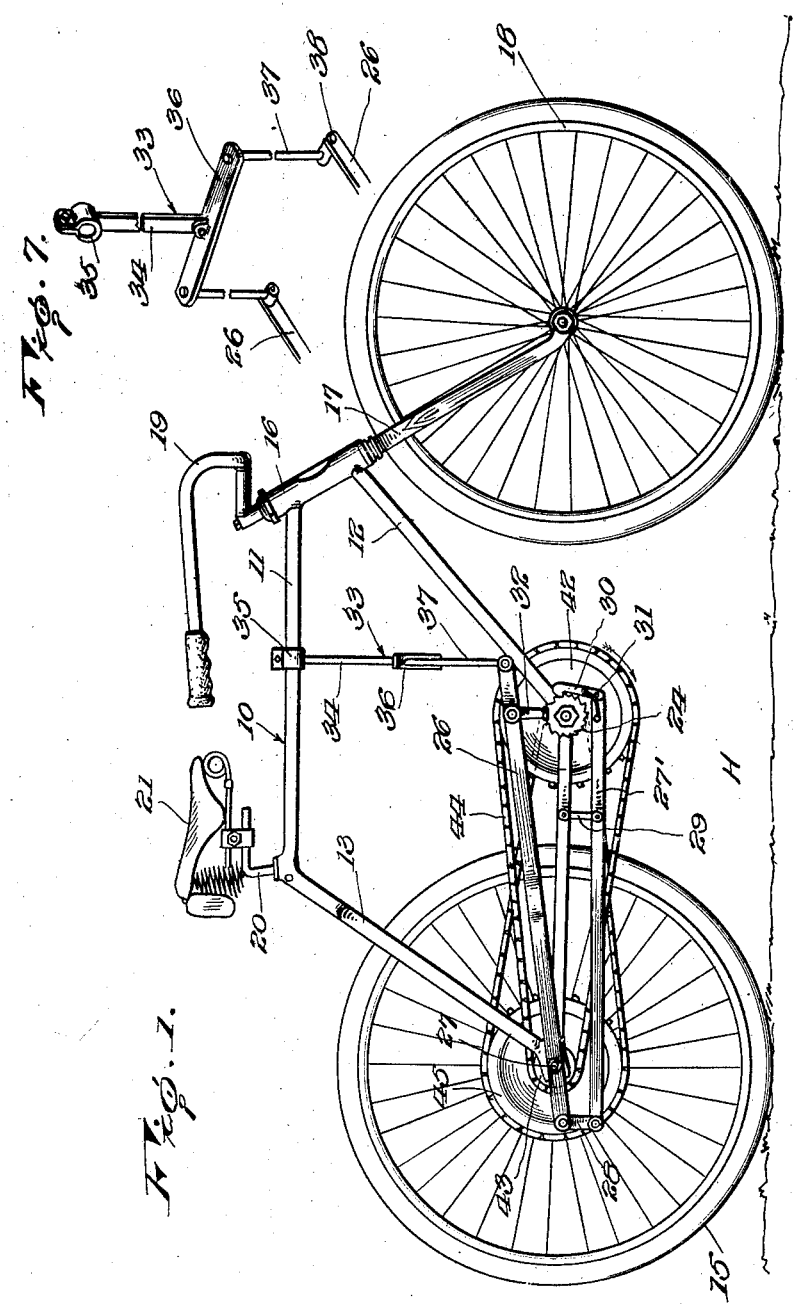

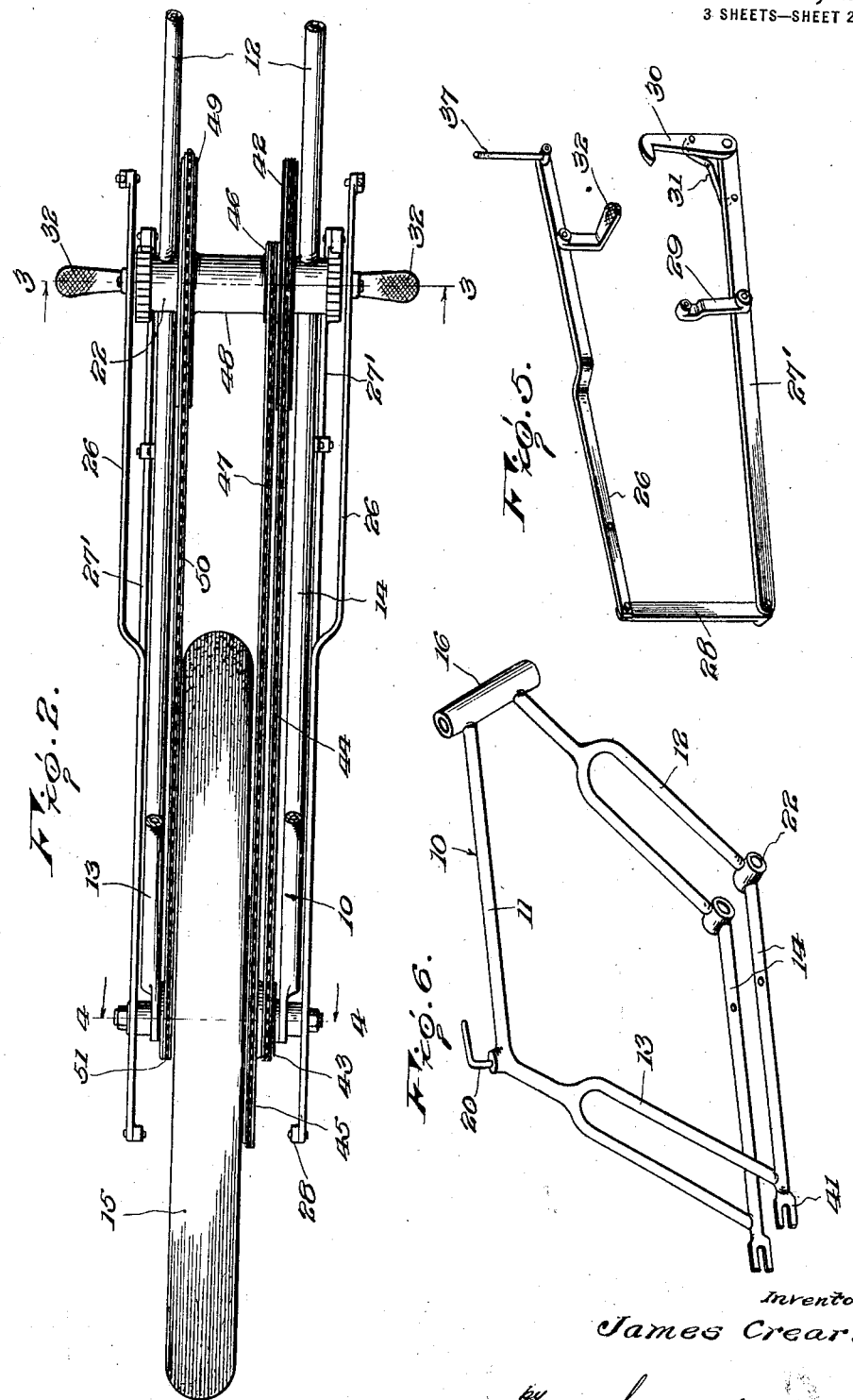

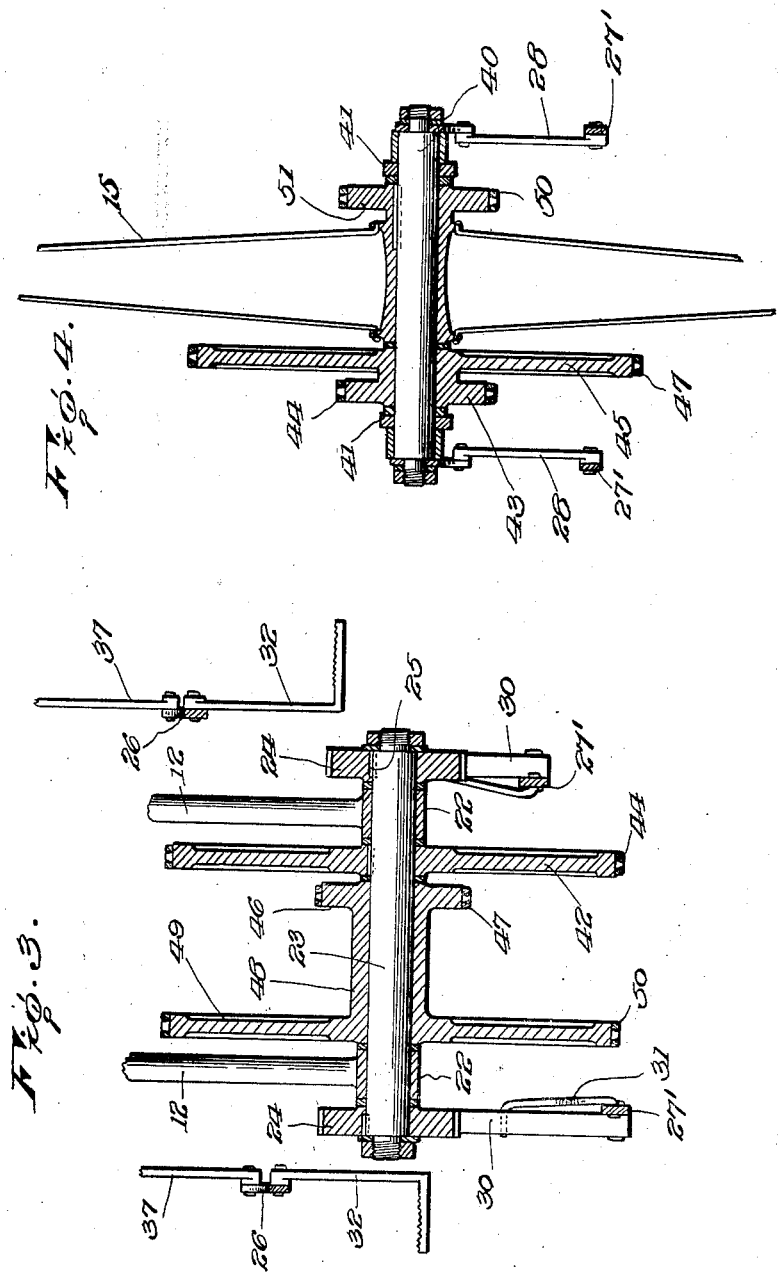

JAMES CREAR, OF CHICAGO, ILLINOIS.

BICYCLE.

1,343,616.  Specification of Letters Patent.  Patented June 15, 1920.

Application filed September 30, 1919. Serial No. 327,512.

*To all whom it may concern:*

Be it known that I, JAMES CREAR, a citizen of the United States, residing at Chicago, in the county of Cook and State of Illinois, have invented certain new and useful Improvements in Bicycles, of which the following is a specification.

This invention relates to improvements in manually propelled vehicles, and more particularly to the power transmitting means therefor.

An important object of this invention is to provide a bicycle having novel means for conveying the power to the driving wheel with a minimum of lost motion, whereby the bicycle may be propelled with a minimum of effort on the part of the operator.

A further object of the invention is to provide a bicycle having a novel arrangement of pawl and ratchet power transmitting means for enabling each depression of the foot to advance the bicycle a considerable distance.

A further object of the invention is to provide a bicycle having novel means for stepping up the gear ratio between the pedals and the driving wheels for providing a bicycle capable of attaining a high speed.

A further object of the invention is to provide a bicycle of the described character which is efficient, of highly simplified construction, and desirable in use.

Other objects and advantages of the invention will be apparent during the course of the following description.

In the accompanying drawings forming a part of this application and in which like numerals are employed to designate like parts throughout the same, Figure 1 is a side elevation of a bicycle embodying the invention, Fig. 2 is a horizontal section through the same, Fig. 3 is a vertical transverse section taken on line 3—3 of Fig. 2, viewed in the direction indicated by arrows, Fig. 4 is a vertical transverse section taken on line 4—4 of Fig. 2 viewed in the direction indicated by arrows, Fig. 5 is a perspective of the pedal mechanism detached, Fig. 6 is a perspective of the frame detached, Fig. 7 is a perspective of an evener embodied in the invention, In the drawings wherein for the purpose of illustration is shown a preferred embodiment of this invention, the numeral 10 generally designates the frame of the bicycle constructed of tubular metal and including a longitudinally extending bar 11, and rearwardly and downwardly extending forked front and rear wheel supports 12 and 13 respectively. The lower ends of the forked supports 12 and 13 are connected by a pair of spaced parallel longitudinally extending side bars 14 adapted to be arranged on opposite sides of the rear drive wheel 15. As illustrated in Fig. 1, the forked support 12 and the longitudinally extending bar 11 are connected to a tubular section 16 which rotatably supports a front fork 17. A wheel 18 is mounted between the sides of the front fork 17 and is directed by handle bars 19 connected to the upper end of the fork 17. A seat post 20 is connected to the meeting portions of the bar 11 and the rear fork 13 and forms a support for a seat 21 adapted for supporting the operator of the bicycle.

The meeting ends of the side bars 14 and the fork 12 are provided with transversely extending journals 22 which as illustrated in Fig. 3 rotatably support the shaft 23. A ratchet wheel 24 is keyed as indicated at 25 to each end portion of the shaft or spindle 23 and is adapted to be rotated for operating the spindle.

The mechanism for rotating the ratchet wheels 24 includes a pair of levers 26 arranged on opposite sides of the frame and pivotally connected to the same adjacent their rear end portions as indicated at 27. A second set of levers 27' is arranged beneath the levers 26 and have pivotal connection with the same through the medium of a pair of links 28. With reference to Fig. 1, it will be noted that the links 28 connect the rear end portions of the levers 26 and 27, whereby a downward movement of the forward end of the levers 26 elevates the rear end portions of the levers 27. A hanger 29 is suspended from each bar 14 and is pivotally connected to the intermediate portion of the adjacent lever 27 so that an upward movement of the rear end portions of the lever 27 will cause the forward end portion of the lever 27 to be lowered. A pawl 30 is pivotally connected to the forward end of each lever 27 and is retained in engagement with the adjacent ratchet wheel 24 by a spring 31. The spring 31 permits of a slight outward movement of the pawl during its upward movement over the peripheral teeth of the coacting ratchet wheel. A pedal 32 is pivotally suspended from the forward end portion of each lever 26 and is adapted to be depressed by the operator for propelling the vehicle. The pedals 32 on opposite sides of the frame are alternately depressed so that the pawls 30 will be alternately caused to impart a partial rotation to the adjacent ratchet wheel.

An evener generally designated by the numeral 33 is suspended from the bar 11 and is adapted to alternately elevate each of the levers 26. The evener 33 includes a hanger 34 attached to the bar 11 by an attaching strap 35. The hanger 34 pivotally supports an evener rod 36 having links 37 suspended from its ends and pivotally connected to the forward ends of the levers 26 as indicated at 38. As one lever 26 is lowered, the cross head or evener rod 36 is moved on its pivot for raising the other lever 26, whereby the pawls 30 are alternately lowered for rotating the ratchet wheels and the shaft 23.

As the pedals 32 move in an arcuate path during their downward movement, the same are operated with a minimum of effort by the operator. During their movement, the pedals 32 do not describe a complete circle and may therefore be depressed without excessive strain on the limbs of the operator.

As illustrated in Fig. 4, the rear wheel 15 is keyed to a rear axle 40 carried by bearing brackets 41. As illustrated in Fig. 3, a sprocket wheel 42 is keyed or otherwise rigidly secured to the front shaft 23 and is adapted to be rotated with the same. A sprocket wheel 43 of a lesser diameter than the sprocket wheel 42 is rotatably arranged on the rear axle 40 and is connected to the sprocket 43 by a link chain 44. A relatively large sprocket wheel 45 is formed integral with the small sprocket wheel 43 and is adapted to rotate with the same. The sprocket wheel 45 is connected with a forward sprocket wheel 46 by a second link chain 47. The transmission of the power through the several sprocket wheels steps up the ratio and causes the rear wheel to be rotated at an increased speed. The forward sprocket wheel 46 is connected to or formed integral with a collar or sleeve 48 rotatably mounted upon the forward shaft 23. The rotation of the sprocket wheel 46 imparts a like movement to a sprocket wheel 49 carried by the collar 48 and rotatably arranged on the shaft 23. The final step in the transmission of power from the pedals 32 to the rear wheel, consists in connecting a sprocket chain 50 with the sprocket wheel 49 and a relatively small sprocket wheel 51 keyed or otherwise rigidly secured to the rear axle 40. With reference to Fig. 2, it will be noted that a single downward movement on either of the pedals imparts a number of revolutions to the driving wheel 15 and therefore the vehicle is propelled at a very rapid speed.

In the practice of the invention, one seats himself on the bicycle and alternately depresses the pedals 32 for lowering the forward ends of the levers 26. The rear end portions of the levers 26 are thereby elevated and caused to elevate the rear end portions of the lower levers 27. The alternate upward movement of the rear end portions of the levers 27 as the result of a like movement of the levers 26 causes the pawls 30 to be alternately lowered for imparting a rotary movement to the ratchet wheels 24. When either pawl reaches the limit of its downward movement, the evener elevates the same during the upward movement of the other lever 26, whereby the pedals 32 are alternately elevated.

In operating the pedals 32, the operator moves the limbs downward in an arcuate path for a short distance and thereby causes the alternate pivotal movement of the lower levers 27 which results in the propulsion of the vehicle.

In transmitting the power to the rear wheels through the several sprocket wheels and sprocket chains as described, the rear wheel is very rapidly rotated for enabling the operator to travel at a considerable speed with a minimum number of power strokes on the pedals 32.

It is to be understood that the form of the invention herewith shown and described is to be taken as a preferred example of the same and that such minor changes in arrangement and construction of parts may be made as will remain within the spirit of the invention and the scope of what is claimed.

Having thus described this invention, what is claimed is:

1. A bicycle including a frame having a rear fork, a drive wheel rotatably carried by the fork, a shaft carried by the frame and operatively connected to the drive wheel, ratchet wheels mounted on said shaft, a pair of levers pivoted adjacent their rear ends to said fork, pedals pivotally suspended from the forward portions of said levers, links pivotally suspended from the rear ends of said levers, a second pair of levers pivotally connected to the lower ends of said links, hangers suspended from said frame and pivotally connected to the intermediate portions of said second named levers, pawls pivotally carried by the forward ends of said second named levers and engaging said ratchet wheels, springs carried by said second named levers and contacting with said pawls for retaining the same in engagement with said ratchet wheels, and an evener for alternately elevating said pedals.

2. A bicycle including a frame, an axle carried by the frame, a drive wheel mounted on the axle, a shaft carried by the frame forwardly of said drive wheel, a sprocket wheel keyed to said shaft, a two-part sprocket wheel rotatably arranged on said axle and operatively connected to said sprocket wheel, a second two-part sprocket wheel mounted on said shaft and operatively connected to said first named two-part sprocket wheel, and means to connect said second named two-part sprocket wheel to said drive wheel.

3. A bicycle including a frame having a horizontal bar and a downwardly and rearwardly extending fork, a wheel having an axle secured to said fork, a pair of levers pivoted adjacent their rear ends to the axle of said wheel, links suspended from the rear ends of said levers, a second set of levers pivoted at their rear ends to said links, hangers suspended from the frame and pivoted to the intermediate portions of said second named set of levers, a transverse shaft carried by the frame, ratchet wheels mounted on said shaft, spring pressed pawls carried by the forward ends of said second named levers and engaging said ratchet wheels, a horizontally pivoted cross head having a hanger attached to said horizontal bar of the frame, and a pair of downwardly extending links connected to the ends of said cross head and to the forward ends of said first named set of levers for alternately elevating said first named levers.

In testimony whereof I affix my signature.

JAMES CREAR. [L. S.]